(12) United States Patent
Baishya et al.

(10) Patent No.: US 11,429,781 B1
(45) Date of Patent: Aug. 30, 2022

(54) SYSTEM AND METHOD OF ANNOTATING PRESENTATION TIMELINE WITH QUESTIONS, COMMENTS AND NOTES USING SIMPLE USER INPUTS IN MOBILE DEVICES

(71) Applicant: ON24, Inc., San Francisco, CA (US)

(72) Inventors: Dhruba Baishya, Emeryville, CA (US); Jayesh Sahasi, Los Altos, CA (US)

(73) Assignee: ON24, INC., San Francisco, CA (US)

( * ) Notice: Subject to any disclaimer, the term of this patent is extended or adjusted under 35 U.S.C. 154(b) by 0 days.

(21) Appl. No.: 14/060,543

(22) Filed: Oct. 22, 2013

(51) Int. Cl.
*G06F 40/169* (2020.01)

(52) U.S. Cl.
CPC .................. *G06F 40/169* (2020.01)

(58) Field of Classification Search
CPC ............. G06F 17/241; G06F 17/30044; G06F 17/30817; G06F 17/30056; G06F 17/3089; G06F 3/048; G06F 40/169; G06F 16/78; G06F 16/7867; G06F 16/40; G06F 16/4393; G06F 16/489
See application file for complete search history.

(56) References Cited

U.S. PATENT DOCUMENTS

| | | |
|---|---|---|
| 5,220,665 A | 6/1993 | Coyle, Jr. et al. |
| 5,388,197 A | 2/1995 | Rayner |
| 5,420,801 A | 5/1995 | Dockter et al. |
| 5,557,796 A | 9/1996 | Fehskens et al. |
| 5,642,171 A | 6/1997 | Baumgartner et al. |
| 5,680,619 A | 10/1997 | Gudmundson et al. |
| 5,732,216 A | 3/1998 | Logan et al. |
| 5,748,185 A | 5/1998 | Stephan et al. |
| 5,752,244 A | 5/1998 | Rose et al. |
| 5,801,685 A | 9/1998 | Miller et al. |
| 5,815,154 A | 9/1998 | Hirschtick et al. |
| 5,838,973 A | 11/1998 | Carpenter-Smith et al. |
| 5,861,906 A | 1/1999 | Dunn et al. |
| 5,892,915 A | 4/1999 | Duso et al. |

(Continued)

FOREIGN PATENT DOCUMENTS

| | | |
|---|---|---|
| CN | 1500353 A | 5/2004 |
| CN | 103535026 A | 1/2014 |

(Continued)

OTHER PUBLICATIONS

Abla et al., Advanced Tools for enhancing control room collaborations, Fusion Engineering and Design, vol. 81, Issues 15-17, 5th IAEA TM on Control, Data Acquisition, and Remote Participation for Fusion Research—5th IAEA TM, Jul. 2006, pp. 2039-2044 (15 pages), ISSN 0920-3796, DOI: 10.1016/j.jusengdes.200.

(Continued)

*Primary Examiner* — Wilson W Tsui
(74) *Attorney, Agent, or Firm* — Manatt, Phelps & Phillips, LLP

(57) ABSTRACT

A system and method for presentation timeline annotation are provided. The system permits an audience member to interact with the presentation using simple inputs, such as key presses on desktop computers or gestures on a mobile device for example, to mark a segment of the presentation timeline with various interactive annotation capabilities including, for example a question, a comment, a rating or a large number of other interactive annotation capabilities.

31 Claims, 13 Drawing Sheets

(56) References Cited

U.S. PATENT DOCUMENTS

| | | |
|---|---|---|
| 5,929,850 A | 7/1999 | Broadwin et al. |
| 5,996,015 A | 11/1999 | Day et al. |
| 6,006,332 A | 12/1999 | Rabne et al. |
| 6,008,807 A | 12/1999 | Bretschneider et al. |
| 6,009,458 A | 12/1999 | Hawkins et al. |
| 6,014,706 A | 1/2000 | Cannon et al. |
| 6,058,424 A | 5/2000 | Dixon et al. |
| 6,097,441 A | 8/2000 | Allport |
| 6,108,645 A | 8/2000 | Eichstaedt et al. |
| 6,141,595 A | 10/2000 | Gloudeman et al. |
| 6,155,840 A | 12/2000 | Sallette |
| 6,157,809 A | 12/2000 | Kaqmbayashi |
| 6,223,292 B1 | 4/2001 | Dean et al. |
| 6,253,368 B1 | 6/2001 | Nelin et al. |
| 6,324,683 B1 | 11/2001 | Fuh et al. |
| 6,366,916 B1 | 4/2002 | Baer et al. |
| 6,396,500 B1 | 5/2002 | Qureshi et al. |
| 6,404,978 B1 | 6/2002 | Abe |
| 6,445,834 B1 | 9/2002 | Rising, III et al. |
| 6,452,609 B1 | 9/2002 | Katinsky et al. |
| 6,473,749 B1 | 10/2002 | Smith et al. |
| 6,523,022 B1 | 2/2003 | Hobbs |
| 6,535,909 B1 | 3/2003 | Rust |
| 6,538,665 B2 | 3/2003 | Crow et al. |
| 6,546,405 B2 | 4/2003 | Gupta et al. |
| 6,601,026 B2 | 7/2003 | Appelt et al. |
| 6,628,279 B1 | 9/2003 | Schell et al. |
| 6,629,065 B1 | 9/2003 | Gadh et al. |
| 6,636,237 B1 | 10/2003 | Murray et al. |
| 6,636,888 B1 | 10/2003 | Bookspan et al. |
| 6,657,543 B1 | 12/2003 | Chung |
| 6,697,805 B1 | 2/2004 | Choquier et al. |
| 6,714,909 B1 | 3/2004 | Gibbon et al. |
| 6,715,126 B1 | 3/2004 | Chang et al. |
| 6,728,753 B1 | 4/2004 | Parasnis et al. |
| 6,745,344 B1 | 6/2004 | Gibbon et al. |
| 6,748,382 B1 | 6/2004 | Mohan et al. |
| 6,795,972 B2 | 9/2004 | Rovira |
| 6,801,224 B1 | 10/2004 | Chang et al. |
| 6,834,308 B1 | 12/2004 | Ikezoye et al. |
| 6,842,175 B1 | 1/2005 | Schmalstieg et al. |
| 6,850,944 B1 | 2/2005 | MacCall et al. |
| 6,859,838 B1 | 2/2005 | Puranik et al. |
| 6,877,023 B1 | 4/2005 | Maffeis et al. |
| 6,920,181 B1 | 7/2005 | Porter |
| 7,062,722 B1 | 6/2006 | Carlin et al. |
| 7,079,990 B2 | 7/2006 | Haller et al. |
| 7,096,416 B1 | 8/2006 | Smith et al. |
| 7,103,770 B2 | 9/2006 | Conrath |
| 7,146,329 B2 | 12/2006 | Conkwright et al. |
| 7,168,035 B1 | 1/2007 | Bell et al. |
| 7,188,186 B1 | 3/2007 | Meyer et al. |
| 7,281,034 B1 | 10/2007 | Eyal |
| 7,281,060 B2 | 10/2007 | Hofmann et al. |
| 7,290,057 B2 | 10/2007 | Suanders et al. |
| 7,296,137 B2 | 11/2007 | Moyer |
| 7,313,595 B2 | 12/2007 | Rust |
| 7,330,875 B1 | 2/2008 | Parasnis et al. |
| 7,349,944 B2 | 3/2008 | Vernon |
| 7,350,231 B2 | 3/2008 | Madison et al. |
| 7,363,372 B2 | 4/2008 | Potenzone et al. |
| 7,370,269 B1 * | 5/2008 | Prabhu et al. ............... 715/230 |
| 7,415,529 B2 | 8/2008 | Saunders et al. |
| 7,418,431 B1 | 8/2008 | Nies et al. |
| 7,441,201 B1 | 10/2008 | Printezis |
| 7,454,708 B2 | 11/2008 | O'Neal et al. |
| 7,559,055 B2 | 7/2009 | Yang et al. |
| 7,561,178 B2 | 7/2009 | Baartman et al. |
| 7,590,945 B2 | 9/2009 | Sims et al. |
| 7,711,722 B1 | 5/2010 | Sahasi et al. |
| 7,712,052 B2 | 5/2010 | Szeliski et al. |
| 7,873,638 B2 | 1/2011 | Young et al. |
| 8,234,336 B2 | 7/2012 | Slater et al. |
| 8,392,821 B2 * | 3/2013 | DeMarco et al. ............ 715/230 |
| 8,443,041 B1 | 5/2013 | Krantz et al. |
| 8,447,664 B1 | 5/2013 | Pape et al. |
| 8,682,672 B1 | 3/2014 | Ha et al. |
| 8,682,969 B1 | 3/2014 | Sahasi et al. |
| 8,706,812 B2 | 4/2014 | Sahasi et al. |
| 8,798,252 B2 | 8/2014 | Krantz et al. |
| 9,046,995 B2 | 6/2015 | Garland |
| 9,148,480 B2 | 9/2015 | Sahasi et al. |
| 9,224,173 B2 | 12/2015 | Arora et al. |
| 9,553,922 B1 | 1/2017 | Guarraci et al. |
| 9,720,577 B1 | 8/2017 | Sahasi |
| 9,892,028 B1 | 2/2018 | Garland |
| 9,973,576 B2 | 5/2018 | Sahasi et al. |
| 10,430,491 B1 | 10/2019 | Joshi et al. |
| 10,749,948 B2 | 8/2020 | Sahasi et al. |
| 10,785,325 B1 | 9/2020 | Baishya et al. |
| 2001/0027420 A1 | 10/2001 | Boublik et al. |
| 2001/0032242 A1 | 10/2001 | Terahama et al. |
| 2001/0032305 A1 | 10/2001 | Barry |
| 2002/0016788 A1 | 2/2002 | Burridge |
| 2002/0026323 A1 * | 2/2002 | Sakaguchi et al. ............... 705/1 |
| 2002/0059342 A1 | 5/2002 | Gupta et al. |
| 2002/0065635 A1 | 5/2002 | Lei et al. |
| 2002/0078150 A1 | 6/2002 | Thompson et al. |
| 2002/0085029 A1 | 7/2002 | Ghani |
| 2002/0087496 A1 | 7/2002 | Stirpe et al. |
| 2002/0107673 A1 | 8/2002 | Haller et al. |
| 2002/0112031 A1 | 8/2002 | Franklin et al. |
| 2002/0112155 A1 | 8/2002 | Martherus et al. |
| 2002/0112247 A1 | 8/2002 | Horner et al. |
| 2002/0122050 A1 | 9/2002 | Sandberg |
| 2002/0133719 A1 | 9/2002 | Westerdal |
| 2002/0143901 A1 | 10/2002 | Lupo et al. |
| 2002/0152278 A1 | 10/2002 | Pontenzone et al. |
| 2002/0193895 A1 | 12/2002 | Qian et al. |
| 2003/0004791 A1 | 1/2003 | Kojima |
| 2003/0005019 A1 | 1/2003 | Pabla et al. |
| 2003/0005465 A1 | 1/2003 | Connely |
| 2003/0014521 A1 | 1/2003 | Elson et al. |
| 2003/0025650 A1 | 2/2003 | Uesaki et al. |
| 2003/0037131 A1 | 2/2003 | Verma |
| 2003/0061280 A1 | 3/2003 | Bulson et al. |
| 2003/0061330 A1 | 3/2003 | Frisco et al. |
| 2003/0071810 A1 | 4/2003 | Shoov et al. |
| 2003/0086682 A1 | 5/2003 | Schofield et al. |
| 2003/0101091 A1 | 5/2003 | Levin et al. |
| 2003/0115267 A1 | 6/2003 | Hinton et al. |
| 2003/0154277 A1 | 8/2003 | Haddad et al. |
| 2003/0156135 A1 | 8/2003 | Lucarelli |
| 2003/0167315 A1 | 9/2003 | Chowdhry et al. |
| 2003/0204566 A1 | 10/2003 | Dhupelia et al. |
| 2004/0024898 A1 | 2/2004 | Wan |
| 2004/0030787 A1 | 2/2004 | Jandel et al. |
| 2004/0032424 A1 | 2/2004 | Florschuetz |
| 2004/0039834 A1 | 2/2004 | Saunders et al. |
| 2004/0049539 A1 | 3/2004 | Reynolds et al. |
| 2004/0054542 A1 | 3/2004 | Foote et al. |
| 2004/0059941 A1 | 3/2004 | Hardman et al. |
| 2004/0073629 A1 | 4/2004 | Bazot et al. |
| 2004/0098754 A1 * | 5/2004 | Vella et al. ............... 725/135 |
| 2004/0103150 A1 | 5/2004 | Ogdon et al. |
| 2004/0125877 A1 | 7/2004 | Chang et al. |
| 2004/0143603 A1 | 7/2004 | Kaufmann et al. |
| 2004/0148375 A1 | 7/2004 | Levett et al. |
| 2004/0153504 A1 | 8/2004 | Hutchinson et al. |
| 2004/0162787 A1 | 8/2004 | Madison et al. |
| 2004/0167896 A1 | 8/2004 | Eakin |
| 2004/0187140 A1 | 9/2004 | Aigner et al. |
| 2004/0237120 A1 | 11/2004 | Lewin et al. |
| 2004/0243928 A1 | 12/2004 | Hesmer et al. |
| 2004/0268224 A1 | 12/2004 | Balkus et al. |
| 2005/0039131 A1 | 2/2005 | Paul |
| 2005/0093860 A1 | 5/2005 | Yanagisawa et al. |
| 2005/0138560 A1 | 6/2005 | Lee et al. |
| 2005/0144258 A1 | 6/2005 | Burckart et al. |
| 2005/0183143 A1 | 8/2005 | Anderholm et al. |
| 2005/0204148 A1 | 9/2005 | Mayo et al. |
| 2005/0212797 A1 | 9/2005 | Lee et al. |
| 2005/0223340 A1 | 10/2005 | Repka |
| 2005/0223341 A1 | 10/2005 | Repka |

(56) References Cited

U.S. PATENT DOCUMENTS

| | | |
|---|---|---|
| 2005/0223342 A1 | 10/2005 | Repka et al. |
| 2005/0278650 A1 | 12/2005 | Sims et al. |
| 2005/0288001 A1 | 12/2005 | Foster et al. |
| 2006/0005114 A1 | 1/2006 | Williamson et al. |
| 2006/0031914 A1 | 2/2006 | Dakss et al. |
| 2006/0048058 A1 | 3/2006 | O'Neal et al. |
| 2006/0106780 A1 | 5/2006 | Degan |
| 2006/0129933 A1 | 6/2006 | Land et al. |
| 2006/0150149 A1 | 7/2006 | Chandhoke et al. |
| 2006/0167896 A1 | 7/2006 | Kapur et al. |
| 2006/0235973 A1 | 10/2006 | McBride et al. |
| 2006/0265495 A1 | 11/2006 | Butler et al. |
| 2006/0277553 A1 | 12/2006 | Henning et al. |
| 2007/0038931 A1 | 2/2007 | Allaire et al. |
| 2007/0055401 A1 | 3/2007 | Van Bael et al. |
| 2007/0121850 A1 | 5/2007 | Klos et al. |
| 2007/0174905 A1 | 7/2007 | Martherus et al. |
| 2007/0192613 A1 | 8/2007 | Amoroso et al. |
| 2007/0192727 A1 | 8/2007 | Finley et al. |
| 2007/0211065 A1 | 9/2007 | Feth et al. |
| 2007/0245243 A1* | 10/2007 | Lanza et al. .............. 715/723 |
| 2007/0271367 A1 | 11/2007 | Yardeni et al. |
| 2007/0282858 A1 | 12/2007 | Arner et al. |
| 2008/0005240 A1 | 1/2008 | Knighton et al. |
| 2008/0005247 A9 | 1/2008 | Khoo |
| 2008/0028341 A1 | 1/2008 | Szeliski et al. |
| 2008/0062969 A1 | 3/2008 | Picard et al. |
| 2008/0062970 A1 | 3/2008 | Picard et al. |
| 2008/0086456 A1 | 4/2008 | Rasanen et al. |
| 2008/0109396 A1 | 5/2008 | Kacin |
| 2008/0120336 A1 | 5/2008 | Bergman et al. |
| 2008/0162206 A1 | 7/2008 | Mak et al. |
| 2008/0189162 A1 | 8/2008 | Ganong et al. |
| 2008/0201736 A1 | 8/2008 | Gordon et al. |
| 2008/0235189 A1 | 9/2008 | Rayman et al. |
| 2008/0270151 A1 | 10/2008 | Mahoney et al. |
| 2008/0276271 A1 | 11/2008 | Anderson et al. |
| 2009/0013244 A1 | 1/2009 | Cudich et al. |
| 2009/0019367 A1 | 1/2009 | Cavagnari et al. |
| 2009/0044138 A1 | 2/2009 | Rudolph et al. |
| 2009/0049385 A1 | 2/2009 | Blinnikka et al. |
| 2009/0066366 A1 | 3/2009 | Solomon |
| 2009/0083641 A1 | 3/2009 | Christy |
| 2009/0094520 A1* | 4/2009 | Kulas ............... G06F 16/7867 715/723 |
| 2009/0094544 A1 | 4/2009 | Savage |
| 2009/0100372 A1 | 4/2009 | Lauridsen et al. |
| 2009/0133048 A1 | 5/2009 | Gibbs et al. |
| 2009/0138508 A1 | 5/2009 | Tolle et al. |
| 2009/0171968 A1 | 7/2009 | Kane et al. |
| 2009/0172021 A1 | 7/2009 | Kane et al. |
| 2009/0172597 A1 | 7/2009 | Mercer |
| 2009/0187825 A1* | 7/2009 | Sandquist et al. ............ 715/719 |
| 2009/0217187 A1 | 8/2009 | Kendall et al. |
| 2009/0222842 A1 | 9/2009 | Narayanan et al. |
| 2009/0259937 A1 | 10/2009 | Rohall et al. |
| 2009/0287790 A1 | 11/2009 | Upton et al. |
| 2009/0292584 A1 | 11/2009 | Dalal et al. |
| 2009/0292768 A1 | 11/2009 | Franke |
| 2010/0023849 A1 | 1/2010 | Hakim et al. |
| 2010/0037205 A1 | 2/2010 | Maillot et al. |
| 2010/0057415 A1 | 3/2010 | Chu et al. |
| 2010/0189131 A1 | 7/2010 | Branam et al. |
| 2010/0192132 A1 | 7/2010 | Yuan et al. |
| 2010/0216443 A1 | 8/2010 | Jacobstein et al. |
| 2010/0251174 A1 | 9/2010 | Belandrino et al. |
| 2010/0277696 A1 | 11/2010 | Huebner |
| 2010/0325674 A1 | 12/2010 | Liu |
| 2011/0004914 A1* | 1/2011 | Ennis, Jr. ............ H04L 41/0853 726/1 |
| 2011/0010307 A1 | 1/2011 | Bates et al. |
| 2011/0026898 A1 | 2/2011 | Lussier et al. |
| 2011/0035431 A1 | 2/2011 | Geary et al. |
| 2011/0055176 A1 | 3/2011 | Choi et al. |
| 2011/0082719 A1 | 4/2011 | Dutta |
| 2011/0191316 A1 | 8/2011 | Lai et al. |
| 2011/0225015 A1 | 9/2011 | Spivack et al. |
| 2011/0252094 A1 | 10/2011 | Sahasi et al. |
| 2011/0276372 A1 | 11/2011 | Spivack et al. |
| 2011/0289422 A1 | 11/2011 | Spivack et al. |
| 2012/0048298 A1 | 3/2012 | Humphrey et al. |
| 2012/0084292 A1 | 4/2012 | Liang et al. |
| 2012/0109966 A1 | 5/2012 | Liang et al. |
| 2012/0130771 A1 | 5/2012 | Kannan et al. |
| 2012/0158902 A1 | 6/2012 | Udtke et al. |
| 2012/0191716 A1 | 7/2012 | Omoigui |
| 2012/0210247 A1 | 8/2012 | Khouri et al. |
| 2012/0226984 A1* | 9/2012 | Bastide et al. ............... 715/730 |
| 2012/0246137 A1 | 9/2012 | Sallakonda et al. |
| 2012/0254454 A1 | 10/2012 | Margush et al. |
| 2012/0290399 A1 | 11/2012 | England et al. |
| 2012/0290950 A1 | 11/2012 | Rapaport et al. |
| 2012/0310750 A1 | 12/2012 | Schutzbank et al. |
| 2013/0036191 A1 | 2/2013 | Fink et al. |
| 2013/0132374 A1 | 5/2013 | Olstad et al. |
| 2013/0138585 A1 | 5/2013 | Forte |
| 2013/0215116 A1 | 8/2013 | Siddique et al. |
| 2013/0268872 A1 | 10/2013 | Yin et al. |
| 2013/0282611 A1* | 10/2013 | Avedissian ......... G06Q 30/0207 705/347 |
| 2014/0006975 A1* | 1/2014 | Oldham ................ G06Q 50/01 715/753 |
| 2014/0068779 A1 | 3/2014 | Tan et al. |
| 2014/0115466 A1 | 4/2014 | Barak et al. |
| 2014/0123014 A1* | 5/2014 | Keen .............................. 715/719 |
| 2014/0126714 A1 | 5/2014 | Sayko |
| 2014/0126715 A1 | 5/2014 | Lum et al. |
| 2014/0136528 A1 | 5/2014 | Anima et al. |
| 2014/0214691 A1 | 7/2014 | Morris, III |
| 2014/0229839 A1 | 8/2014 | Lynch et al. |
| 2014/0237381 A1 | 8/2014 | Socolof |
| 2014/0279049 A1 | 9/2014 | Wiseman et al. |
| 2014/0289326 A1 | 9/2014 | McCormack et al. |
| 2014/0366098 A1 | 12/2014 | Savage et al. |
| 2014/0372468 A1 | 12/2014 | Collins et al. |
| 2015/0002619 A1 | 1/2015 | Johnston et al. |
| 2015/0006610 A1 | 1/2015 | Johnston et al. |
| 2015/0082021 A1 | 3/2015 | Mandyann et al. |
| 2015/0199411 A1* | 7/2015 | Greenspan ........ G06F 17/30548 715/229 |
| 2015/0213145 A1 | 7/2015 | Baldwin et al. |
| 2015/0213361 A1 | 7/2015 | Gamon et al. |
| 2015/0278363 A1 | 10/2015 | Briere et al. |
| 2015/0304367 A1 | 10/2015 | Chan et al. |
| 2015/0365244 A1 | 12/2015 | Schmiltz et al. |
| 2016/0011729 A1 | 1/2016 | Flores et al. |
| 2016/0028790 A1 | 1/2016 | Eriksson et al. |
| 2016/0180248 A1 | 6/2016 | Regan |
| 2017/0046374 A1 | 2/2017 | Fletcher et al. |
| 2017/0064358 A1 | 3/2017 | Sullivan et al. |
| 2017/0097743 A1 | 4/2017 | Hameed et al. |
| 2017/0140398 A1 | 5/2017 | Fleischman et al. |
| 2017/0243255 A1 | 8/2017 | Sahasi et al. |
| 2017/0255696 A1 | 9/2017 | Pulitzer |
| 2018/0033051 A1 | 2/2018 | Maynard et al. |
| 2018/0211285 A1 | 7/2018 | Todasco et al. |
| 2018/0293610 A1 | 10/2018 | Maynard |
| 2018/0315103 A1 | 11/2018 | Lakshminarayan et al. |
| 2019/0108234 A1 | 4/2019 | Torres et al. |
| 2019/0108438 A1 | 4/2019 | Torres et al. |
| 2020/0267110 A1 | 8/2020 | Nolan et al. |
| 2020/0382583 A1 | 12/2020 | Sahasi et al. |

FOREIGN PATENT DOCUMENTS

| | | |
|---|---|---|
| EP | 2261898 A1 | 12/2010 |
| KR | 20100003117 A | 1/2010 |
| WO | WO02082815 A1 | 10/2002 |
| WO | WO02093352 A1 | 11/2002 |

(56) References Cited

FOREIGN PATENT DOCUMENTS

| WO | WO02097616 A1 | 12/2002 |
| WO | WO2009020770 A1 | 2/2009 |

OTHER PUBLICATIONS

Holmberg et al., "Web Real-Time Communication Use Cases and Requirements"; Internet Engineering Task Force (IETF), dated Mar. 2015 (29 pages).

Draft—C., Holmberg et al., "Web Real-Time Communication Use Cases and Requirements", RTCWEV Working Group, dated Oct. 14, 2013 (25 pages).

Saint-Andre, P. 2005. Streaming XML with Jabber/XMPP. IEEE Internet Computing 9, Apr. 27, 2005, 6 pages. (Sep. 2005).

Sen, Sandip, "An Automated Distributed Meeting Scheduler, PSU," Apr. 2007, 13 pages. http://citeseerx.ist.psu.edu/viewdoc/summary?doi=10.1.1.56.6862.

Sinha et al., "Video Conferencing System," Columbia University, 11 pages. http://www.cs.columbia.edu/sedwards/classes/2009/4840/reports/RVD-presentation.pdf.

On24, "Best practices in Webcasting for Publishing" dated 2006, 16 pages.

Weiser, "Microsoft PowerPoint 2003—Table of Contents, ITM Online Help Collection, UWEC," University of Wisconsin, Eau Claire entitled dated Sep. 19, 2004, (2 pages). archived located @ http://web.archive.org/web/20040919191008/http://www.uwec.edu/help/ppoint03.htm.

Weiser, Microsoft PowerPoint 2003 Viewing Online Presentations: The Environment, UWEC—University of Wisconsin, Eau Claire archived dated Dec. 21, 2004, (2 pages). located @ http://web.archive.org/web/20041221201404/www.uwec.edu/help/PPoint03/webenvir.htm.

Microsoft Corporation—"COM: Component Object Model Technologies"—archived dated Oct. 23, 2004, 2 pages. located @ http://web.archive.org/web/20041023025124/http://www.microsoft.com/com/default.mspx.

Rothganger et al., "3D Object Modeling and Recognition Using Local Affine-Invariant Image Descriptors and Multi-View Spatial Constraints," Department of Computer Science and Beckman Institute, University of Illinois—Cordelia Schmid Inria, France—International Journal of Computer Vision 66(3), 231-259, 2006 (29 pages).

Papadakis et al., "Efficient 3D shape matching and retrieval using a concrete radialized spherical projection representation"—The Journal of the Pattern Recognition Society 40 dated 2007 p. 2437-2452 (16 pages).

"Breeze Manager User Guide," Copyright © 2005 Macromedia, Inc., Second Edition: Jun. 2005, 306 pages.

"Breeze Meeting User Guide for Meeting Hosts and Presenters", Copyright © 2005 Macromedia, Inc., Third Edition: Sep. 2005, 130 pages.

Freeman et al., ""Creative Collaboration between Audiences and Musicians in Flock,"" Georgia Tech Center for Music Technology, Feb. 2010, 17 pages.

Suduc et al., "Exploring Multimedia Web Conferencing," Valahia University of Targoviste, Exploring Multimedia Web Conferencing (Year: 2009), Mar. 2009, 14 pages. https://www.researchgate.net/profile/Suduc_Ana-Maria/publication/26849386.

Marni Gunther, "Webcasting 101: Online Broadcasting in the Meetings and Events Industry", Netbriefings, Inc., Jul. 2008, 2 pages. http://www.netbriefings.com/pdf/0807-MtgsMNHospitality.pdf.

Aguiar, Everaldo, et al. "Engagement vs performance: using electronic portfolios to predict first semester engineering student retention." Proceedings of the Fourth International Conference on Learning Analytics and Knowledge. 2014: 103-112 (Year: 2014), 10 pages.

Navarathna, Rajitha, et al. "Estimating audience engagement to predict movie ratings." IEEE Transactions on Affective Computing 10.1 (Jul. 3, 2017): 48-59. (Year: 2017), 12 pages.

Sam Dutton, "Get Started with WebRTC", published Jul. 23, 2012 (updated: Nov. 24, 2020), 24 pages. https://www.html5rocks.com/en/tutorials/webrtc/basics/.

Ebner, et al.; "First steps towards an integration of a Personal Learning Environment at university level", Jan. 1, 2011, 15 pages.

Berthold et al.; "Psycho-pedagogical Mash-up Design for Personalizing the Learning Environment", Knowledge Management Institute, Graz University of Technology, Austria, Jul. 11, 2011, 15 pages.

\* cited by examiner

SYSTEM AND METHOD OF ANNOTATING PRESENTATION TIMELINE WITH QUESTIONS, COMMENTS AND NOTES USING SIMPLE USER INPUTS IN MOBILE DEVICES

FIELD

The disclosure relates to web-based content presentations, where presentations can be broadly divided into three categories including live or recorded interactive webcasting, podcasting (video or audio), and slideshows. The disclosure more specifically relates to a system and method for allow an audience member to provide interactive annotations to a presentation timeline using simple inputs.

BACKGROUND

Due to the lack of currently available non-interruptive question and answer (Q&A) (i.e., the presenter speaking in a large event or meeting can't stop to view or answer every question while presenting), asking questions, commenting and note taking during presentations to large audiences requires audience members to regularly break-out of the presentation to do trivial tasks like asking questions or writing a comment or note. Very often these tasks are performed through widgets and forms, which in turn prohibit a uniform experience for the audiences.

From the point of view of archiving of audience interactions and feedback—there exists no convenient ways for the audience to quickly go back to the segment of a presentation where a question was asked or a comment was written. Furthermore, for the presenter of a presentation to an audience, there is no convenient way to identify and address segments of the presentation that raised more questions, concerns or feedback from the audiences.

In the current state of the art presentation systems, audience interactions such as question & answering, commenting, reviews and rating are enabled through third-party plugins or custom widgets that are embedded in the web page containing presentation video, audio and slides. For example, there exists popular social commenting plugins from Facebook and Disqus. These currently available solutions are mostly general purpose solutions that have no special concerns for presentation experience or flow. For example—Facebook's commenting plugin can be embedded into any web page usually at the bottom (or side) of main content. New comments and questions get added to the bottom of the main thread or somewhere in the middle of sub-threads. In the process, synchronization of presentation timeline and audience interactions is lost.

DETAILED DESCRIPTION OF ONE OR MORE EMBODIMENTS

The disclosure is particularly applicable to a system and method for annotating presentation timelines in a web casting system and it is in this context that the disclosure will be described. It will be appreciated, however, that the system and method has greater utility because it may be implemented in other manners that are within the scope of the disclosure and may be used for other presentation systems in which the annotation of the presentation timelines is desirable. Furthermore, the system and method for annotating presentation timelines also may be used with audience participation widgets in which the presence, invocation, reuse and overall design and experience of using these widgets alongside a presentation may be changed drastically. Now, a disclosure of an on-line web-based presentation system is provided wherein the on-line web-based presentation system may include the system and method for presentation timeline annotation.

Figure 1:
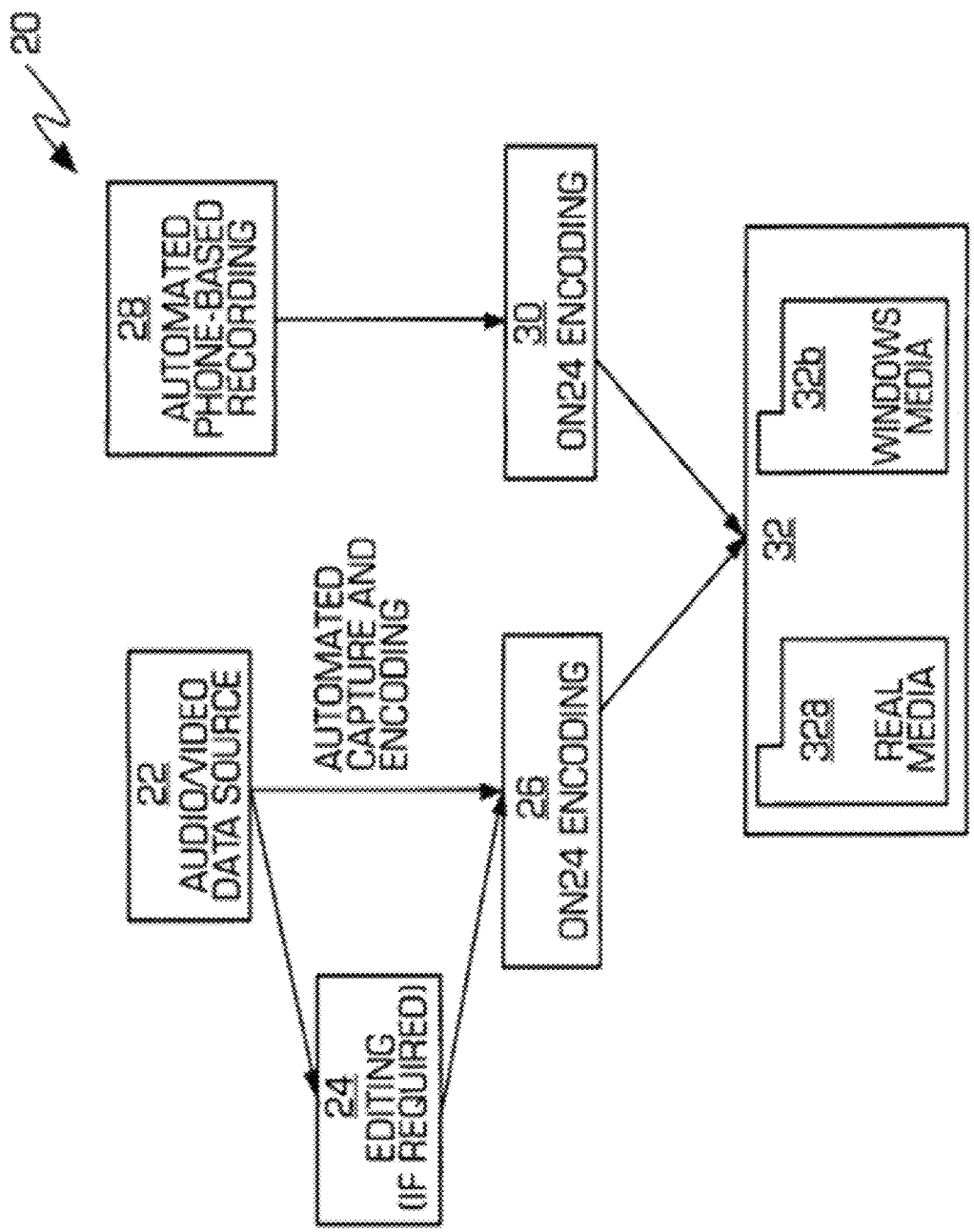
FIG. 1 is a diagram illustrating a method for asset acquisition for an online presentation method.

FIG. 1 is a diagram illustrating a method 20 for asset acquisition for online presentation event system. As shown, an audio/video or audio data source 22 is edited in step 24 if necessary or is automatically captured. In step 26, the data source 22 is encoded. Alternatively, an automated phone-based recording source 28 is encoded in step 30. The encoded data may then be stored in a media database 32, such as in a real media format 32*a* and/or a windows media format 32*b*. In this manner, a data source/piece of media is prepared for distribution using an event system, an example of which is shown in FIG. 2.

Figure 2:
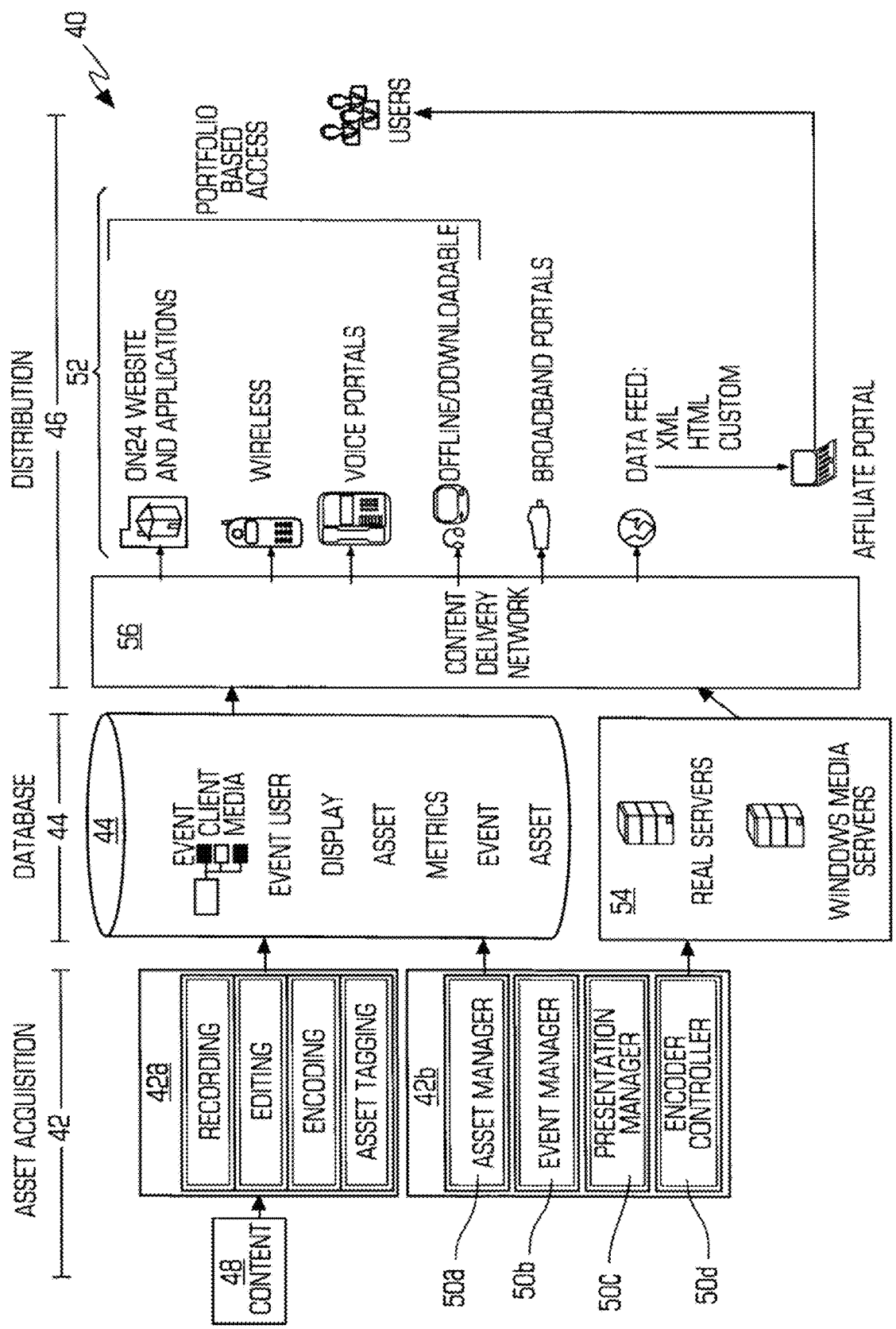
FIG. 2 is a diagram illustrating an example of an online presentation system that may use the presentation timeline annotation system.

FIG. 2 is a diagram illustrating an event system 40 into which the presentation timeline annotation apparatus may be incorporated. The event system 40 may comprise an asset acquisition and event management portion 42, a database portion 44 and a distribution portion 46 wherein a piece of media/content 48 is input into the event system 40 in order to distribute that content/piece of media during the event. Generally, each element of the event system being described is implemented in software wherein each portion may be one or more software modules and each software modules may be a plurality of computer instructions being executed to perform a particular function/operation of the system. Each element of the system may thus be implemented as one or more computer resources, such as typical personal computers, servers or workstations that have one or more processors, persistent storage devices and memory with sufficient computing power in order to store and execute the software modules that form the frame event system in accordance with the invention. The event system may generate an event that is provided to one or more event clients 52 wherein each client is a computing resource, such as a personal computer, workstation, cellular phone, personal digital assistant, wireless email device, telephone, etc. with sufficient computing power to execute the event client located on the client wherein the client communicates with the event system over a wired or wireless connection.

In more detail, the asset acquisition and event management portion 42 may further comprise an asset acquisition portion 42a and an event management portion 42b wherein the asset acquisition portion performs one or more of the following functions: recording of the piece of media/content, editing of the piece of media/content, encoding of the piece of media/content and asset tagging. The event manager module 42b further comprises an asset manager module 50a, an event manager module 50b, a presentation manager module 50c and an encoder controller 50d. The asset manager module 50a, prior to an event, imports/exports content/pieces of media into/from a library of media as needed and manages the assets for each event presentation. The event manager module 50b may perform actions/function prior to and after an event. Prior to a particular event, the event manager module may reserve the event in the system (both resources and access points), set-up an event console which a user interacts with to manage the event and then send messages to each recipient of the upcoming event with the details of how to access/operate the event. After a particular event, the event manager module 50b may permit a user to import an old event presentation into the system in order to re-use one or more pieces of the old event presentation. The presentation manager module 50c, during a particular event presentation, generates an event file with the slides of the event presentation, URLs and polls to an encoder controller to distribute the particular event presentation to the users. The encoder controller 50d encodes the event presentation stream to one or more distribution server 54 that distributes the event presentation to the users.

As shown in FIG. 2, the database 44 may include data about each event, including the clients to which the event is being provided and the media associated with the event, one or more event users, the display of the particular event, the assets associated with the event, the metrics for the event and other event data. In combination with this data in the database for a particular event, operations and commands from the event manager module 42b are downloaded to the distribution servers 54 that distribute each event to each client 52 for the particular event over a distribution network 56. As shown, the event/presentation may be distributed to one or more different clients 52 that use one or more different methods to access the event. The clients 52 may include a client that downloads the presentation and then views the presentation offline.

Figure 3:
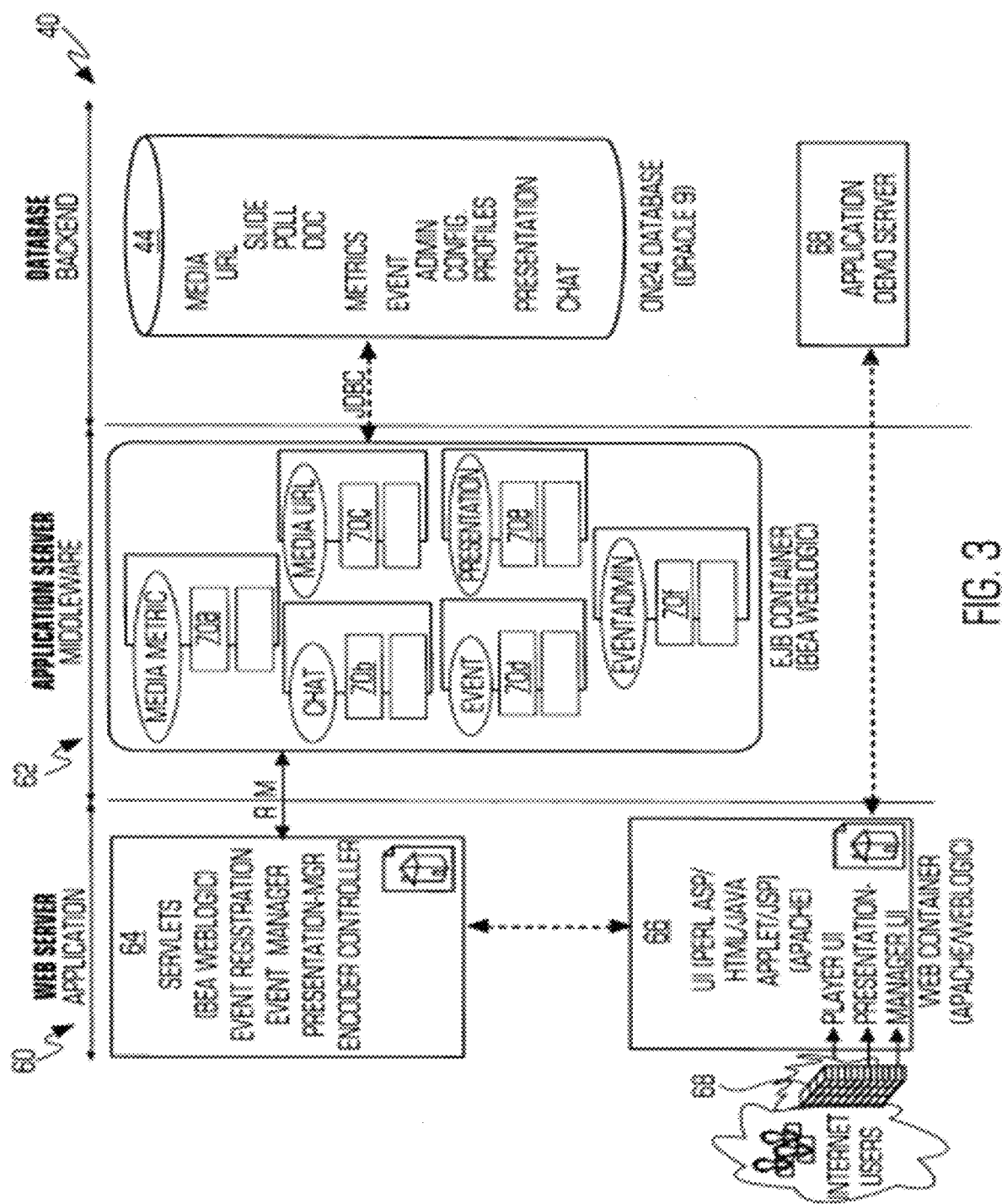
FIG. 3 illustrates a system architecture of the online presentation system shown in FIG. 2.

FIG. 3 illustrates more details of the event system shown in FIG. 2. The event system may include a web server portion 60, an application server portion 62 and the database portion 40 (with the database 44) shown in FIG. 2. Each of these portions may be implemented as one or more computer resources with sufficient computing resources to implement the functions described below. In a preferred embodiment, each portion may be implemented as one or more well-known server computers. The web server portion 60 may further comprise one or more servlets 64 and a web container portion 66 which are both behind a typical firewall 68. In a preferred embodiment of the invention, the servlets reside on a BEA Weblogic system which is commercially available and may include an event registration servlet, an event manager module servlet, a presentation manager module servlet and an encoder controller servlet that correspond to the event manager module 50b, presentation manager module 50c and encoder controller 50c shown in FIG. 2. Each of these servlets implement the functions and operations described above for the respective portions of the system wherein each servlet is a plurality of lines of computer code executed on a computing resource with sufficient computing power and memory to execute the operations. The servlets may communicate with the application server portion 62 using well-known protocols such as, in a preferred embodiment, the well-known remote method invocation (RMI) protocol. The servlets may also communicate with the web container portion 66 which is preferable implemented using an well-known Apache/Weblogic system. The web container portion 66 generates a user interface, preferably using Perl, Active Server Page (ASP), HTML, XML/XSL, Java Applet, Javascript and Java Server Pages (JSPs.) The web container portion 66 may thus generate a user interface for each client and the presentation manager module user interface. The user interface generated by the web container portion 66 may be output to the clients of the system through the firewall as well as to an application demo server 68 that permits a demo of any presentation to be provided.

The application server portion 62 may preferably be implemented using an Enterprise JavaBeans (EJBs) container implemented using a BEA Weblogic product that is commercially sold. The application server management portion 62 may be known as middleware and may include a media metric manager 70a, a chat manager 70b, a media URL manager 70c, an event manager 70d, a presentation manager 70e and an event administration manager 70f which may each be software applications performed the specified management operations. The application server portion 62 communicates with the database 44 using a protocol, such as the well-known Java Database Connectivity (JDBC) protocol in a preferred embodiment of the invention. The database 44 may preferably be implemented using an Oracle 8/9 database product that is commercially available. As shown, the database 44 may include media data including URL data, slide data, poll data and document data. The database 44 may further include metric data, event data and chat data wherein the event data may further preferably include administration data, configuration data and profile data.

Figure 4:
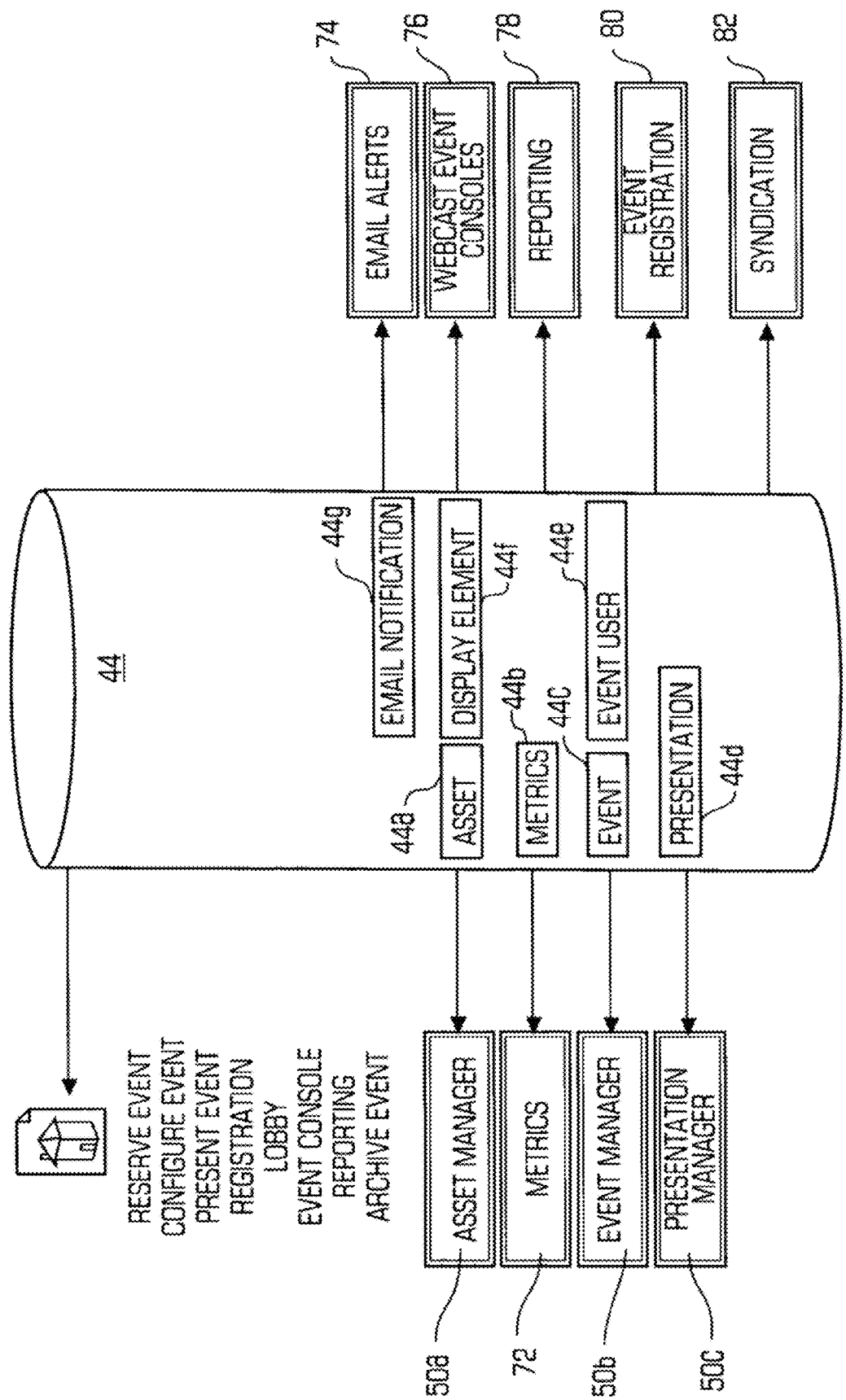
FIG. 4 is a functional diagram of the interacting components of the online presentation system in FIG. 3.

FIG. 4 is a diagram illustrating more details of the event database 44 in FIG. 3. As shown in FIG. 4, the database may generate data that is used to implement a function to reserve an event, to configure an event, present an event, for registration, for the lobby for the event console, for reporting and for archiving an event. The database may include asset data 44a that may be provided to the asset manager module 50a, metrics data 44b that is provided to a metric module 72, event data 44c that is provided to the event manager module 50b, presentation data 44d that is provided to the presentation manager module 50c, event user data 44e that is provided to an event registration module 80, display element data 44f that is provided to an event consoles module 76 and email notification data 44g that is provided to an email alerts module 74. The database may also store data that is used by a reporting module 78 to generate reports about the events and presentations provided by the system. The database may also store data that is used by a syndication module 82 to syndicate and replicate existing presentations.

Figure 5:
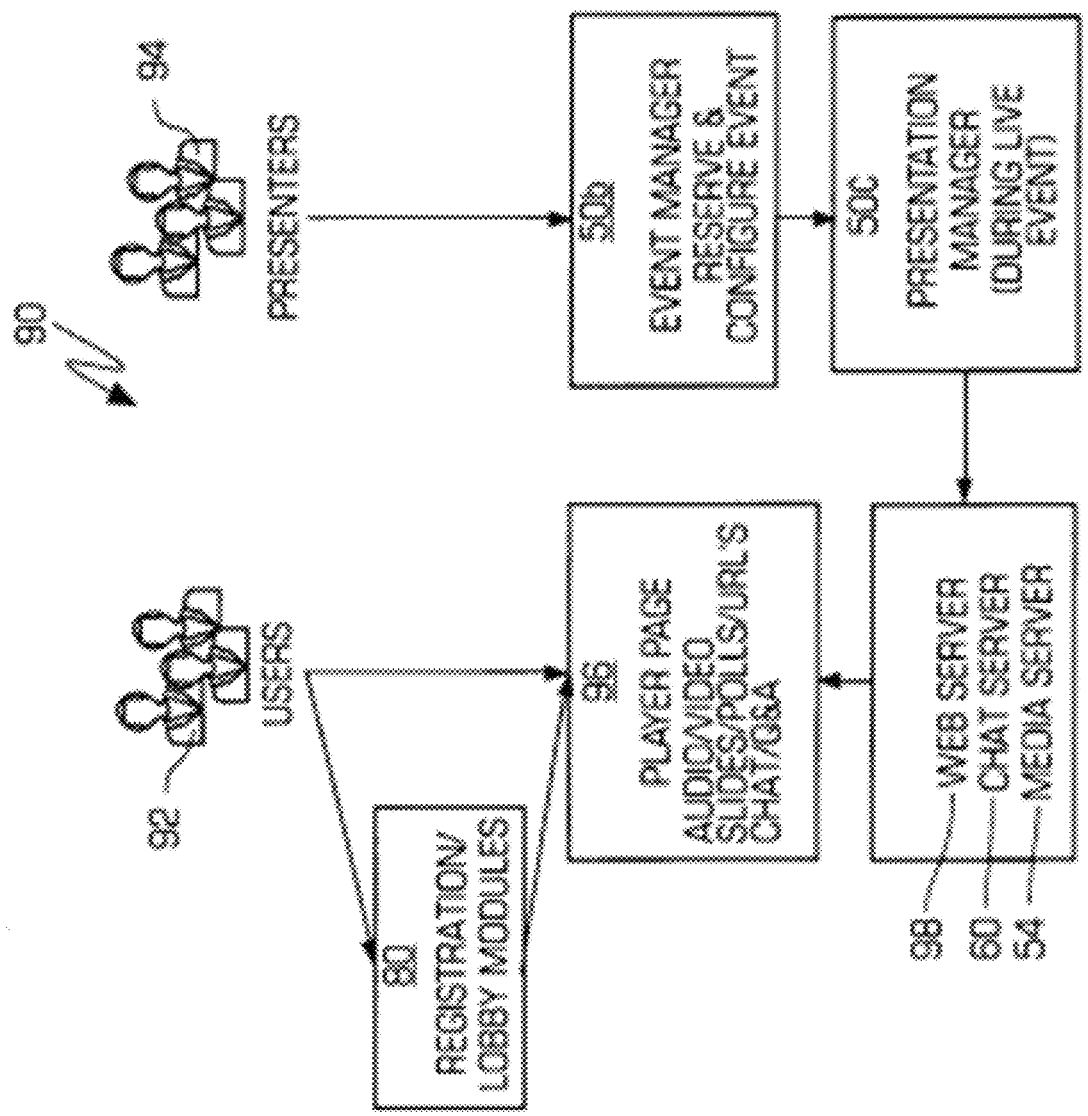
FIG. 5 is a diagram illustrating a presentation workflow.

FIG. 5 is a diagram illustrating an event center 90 that may be utilized by one or more users 92 that are presented with a presentation by the system and one or more presenters 94 who utilize the system to present presentations to the users 92. The users 92 may interact with a registration and lobby modules 80 that permit the users to register with the system and schedule a presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the media server 54 and a chat server 98 that provides the chat functionality for a presentation. The presentation data for a live event presentation is provided to the servers 54, 60 and 98 by the presentation manager module 50c. The presenters 94 may utilize the event manager module 50b to reserve an event and/or configure an event. Once the event is reserve and configured, the presentation data is forwarded to the presentation manager module 50c.

Figure 6:
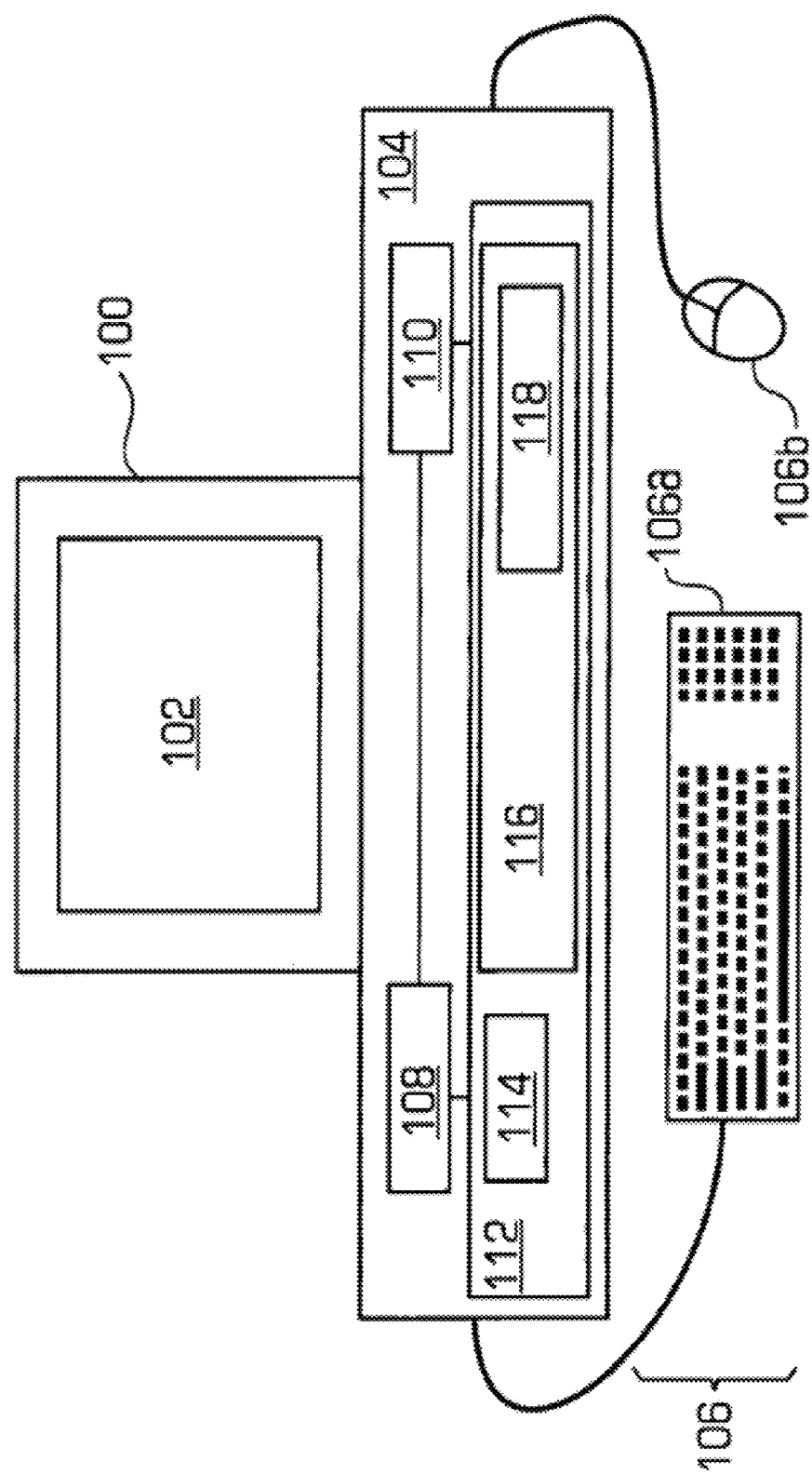
FIG. 6 is a diagram illustrating an example of an online presentation client that may incorporate the presentation timeline annotation system.

FIG. 6 is a diagram illustrating an example of an online presentation client 100 that may incorporate the presentation timeline annotation apparatus. The event client 100 may be implemented as a personal computer, workstation, PDA, cellular phone and the like with sufficient computing power to implement the functions of the client as described below. In the example shown in FIG. 6, the event client may be a typical personal computer that may further comprise a display unit 102, such as a CRT or liquid crystal display or the like, a chassis 104 and one or more input/output devices 106 that permit a user to interact with the client 100, such as, for example, a keyboard 106a and a mouse 106b. The chassis 104 may further include one or more processors 108, a persistent storage device 110, such as a hard disk drive, optical disk drive. tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor(s) 108. The memory may further include an operating system 114, such as Windows, and a typical browser application 116, such as Microsoft Internet Explorer, Mozilla Firefox or Netscape Navigator and an event console module 118 (including a slide, polls, survey, URL, Q&A) that operates within the browser application. The client side of the system/apparatus is implemented as HTML and Javascript code that is downloaded/streamed to the client 100 during/prior to each presentation so that the synchronization of the assets does not require separate client software downloaded to the client.

Figure 7:
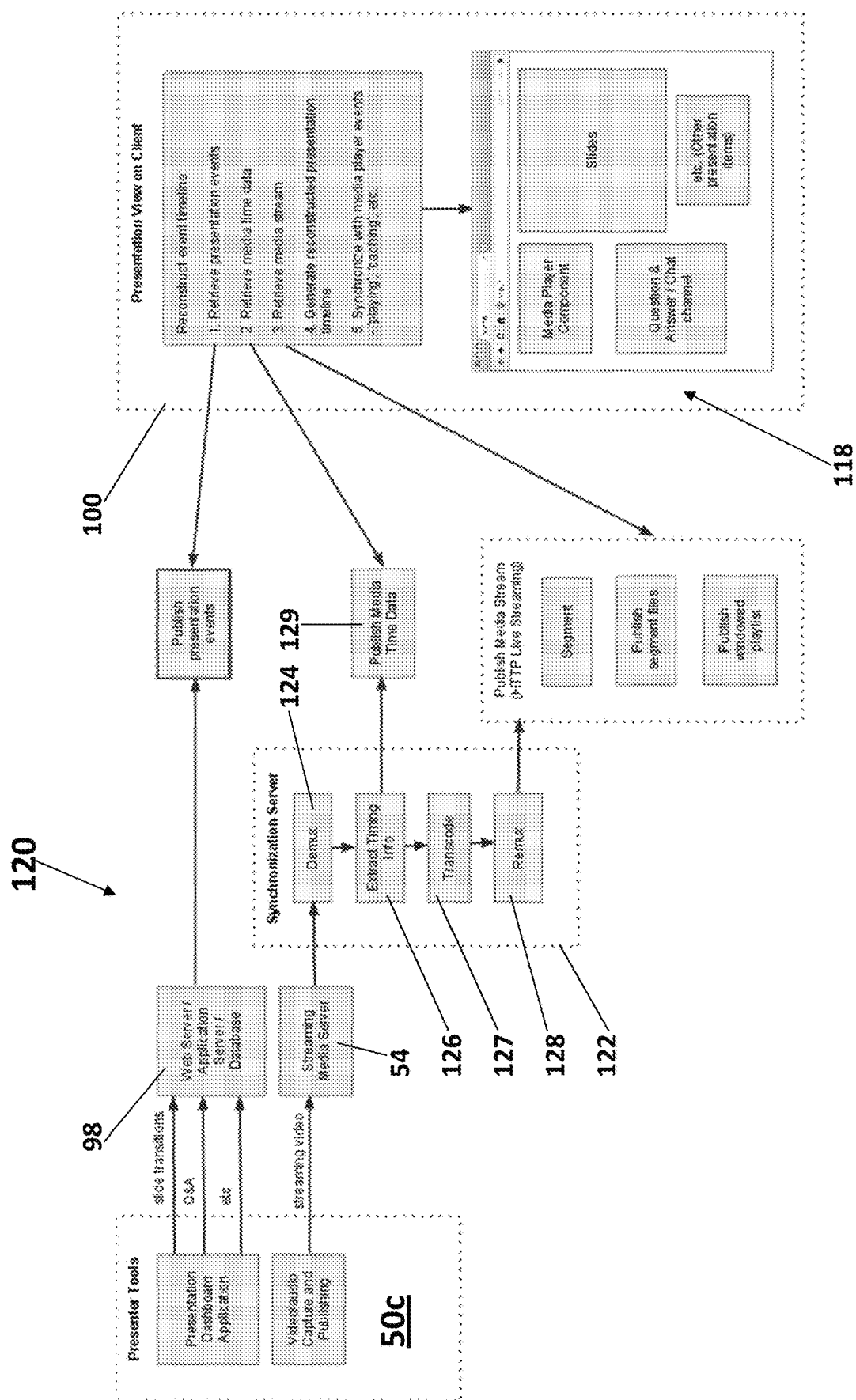
FIG. 7 illustrates a set of media unit components and client components that implement a method for presentation timeline annotation.

FIG. 7 illustrates a set of media unit components and client components that implement a method for reconstructing the timeline of a presentation. To implement the method for reconstructing the timeline of a presentation, a set of media unit components (that may be implemented on one or more server computers) and a set of client 100 components are used that interact with each other. In the method, the audio/video stream must anchor the timeline, from the viewer's point of view. If media playback is delayed on the client-side due to network latency, if the viewer pauses the player for some duration and then resumes playback, or if playback is temporarily paused by the player to allow buffering, then all other presentational events in the webcast must also be offset in time by the same amount which is the goal of the timeline reconstruction method.

The presentation manager 50c, web server/application server/database 98 and the streaming media servers 54 described above are part of the process. In addition, a synchronization unit 122, that may be implemented as one or more server computers, participates the process. In particular, as the presenter's audio and video data is encoded (by an encoder that is part of the media unit) and broadcast (by the media server 54), the synchronization unit 122, acting as if it is client software that receives the media stream, receives the encoded media stream and demultiplexes it using a demultiplexer 124 that is part of the synchronization unit 122. As the raw media stream data is demuxed, timestamps are extracted by a timestamp extractor unit 126 of the synchronization unit 122. The timestamps may be a start time and/or end time for a particular portion of the stream and the like. The timestamps are captured together with informational markers into the stream data—enough information so that the timestamp and its association with a particular piece of media data can be reconstructed and reassociated independently later on the client.

In the system, anything that is part of a presentation that is synchronized with the audio and video may have timestamps. Examples of timecoded serial data may include, but is not limited to, slide/powerpoint flips, captions, animations like a moving virtual pointer, any background/auxiliary information that should be displayed at specific times during the presentation, links to other resources that should be displayed at specific times, for example linking to a participation certificate after viewing time has been reached and polls or surveys that should be displayed at specific times.

After the timestamps are extracted, the stream is remuxed using a multiplexer 128 in the synchronization unit 122 and transmitted to each client who is viewing the particular presentation. Optionally at this step, the media data can additionally be transcoded using a transcoder 127 in the synchronization unit 122 into another format that is supported on the client device. While the re-encoded media stream is being sent to the client, the timeline synchronization information, media data association, and local server time are published (using a timeline publishing unit 129 associated with the synchronization unit 122) in a place and format suitable for retrieval separately by client software.

At a suitable time on the client, when it requests the stream data, it separately also obtains the corresponding timestamp information that was extracted from the media stream previously that corresponds to the current audio/video data, by retrieving it from the location where it was published. Then at an appropriate time on the client side—when the media data has finished buffering and begins playback—the client captures, and saves for later use, the current local device time.

The local device time that is captured at the right moment, will be different than the timestamp captured on the server during in the previous steps, but the two different times will correspond to the same point on the presentation timeline. Those two timestamps and the difference between them, together with the time offset delay calculated from the transmission latency between client and server, can be used to determine the correct time delay to use when rendering all other presentational events of the webcast, such as slide transitions, so that they are rendered on the client in the same time positions as the speaker intends when the presentation is produced.

On each client that is participating in the presentation, the client reconstructs the event timelines by: 1) retrieving the presentation events from the web server/application server/database 98 of the media unit; 2) retrieves the media time data generated by the timeline publishing unit 129; 3) retrieves the re-encoded media stream; 4) generates the reconstruction presentation timeline as described above; and 5) synchronizes with the media player events in the browser 118 (such as the media player component, the question and answer/chat channel, any slides and any other presentation items). The event console manager on each audience member device may be implemented as a plurality of lines of computer code executed by the computer that perform the steps above.

Figure 8:
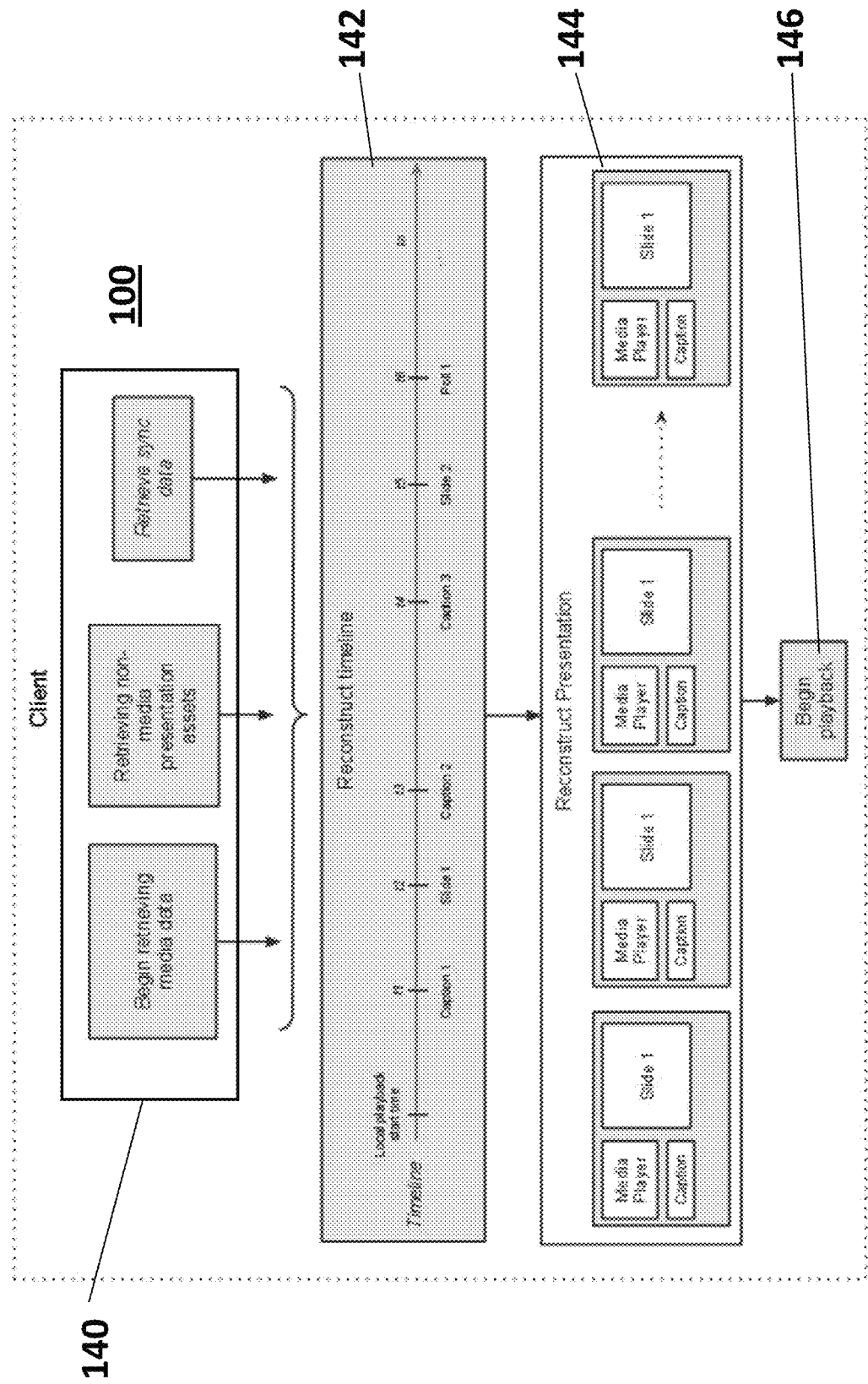
FIG. 8 illustrates an example of an implementation of an event console manager/client that is part of the event presentation system.

FIG. 8 illustrates an example of an implementation of an event console manager/client 100 that is part of the event presentation system. The client performs a presentation preparation process 140 in which the client downloads the media data, retrieves non-media presentation assets and retrieves the sync data. During a reconstruct timeline process 142, the client reconstructs the timeline of the presentation based on the media data, the non-media presentation assets and the sync data. Thus, for example as shown in FIG. 8, the timing of the slides, captions and polls of the presentation are determined as shown pictorially in FIG. 8. Once the timeline is reconstructed, the client reconstructs the presentation (144) for one or more browsers and the presentation playback begins (146).

Figure 9:
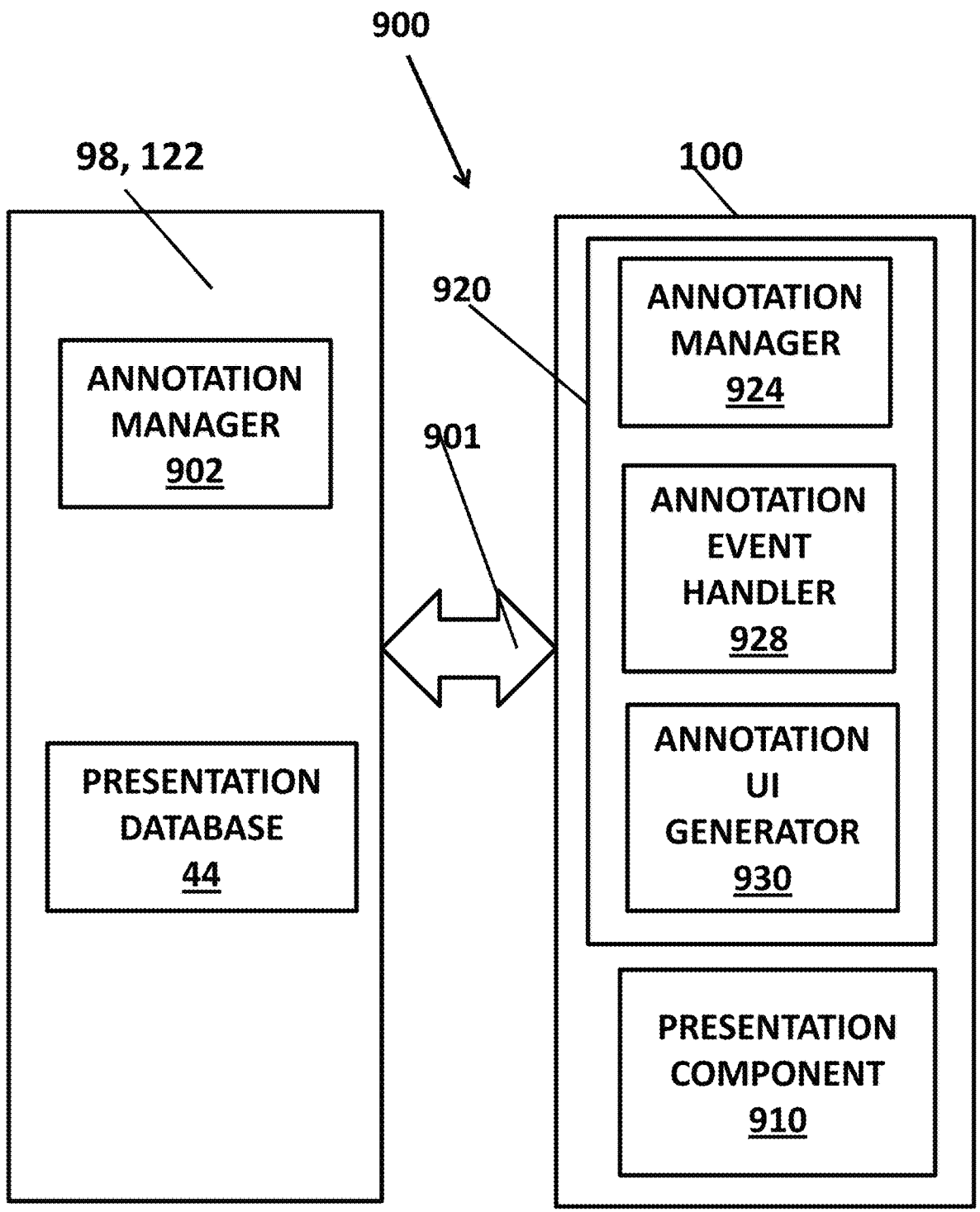
FIG. 9 illustrates more details of the presentation timeline annotation system.

FIG. 9 illustrates more details of the presentation timeline annotation system 900. The presentation timeline annotation system 900 may further comprise one or more components on the backend side 98, 122 and one or more components on the client side 100. The components on the backend side and the client side may interact with each other over a link 901 to implement the presentation timeline annotation system. The link 901 may be a wired or wireless link, such as the Internet, a computer network, a wireless computer network, a cellular data network and the like.

Figure 11:
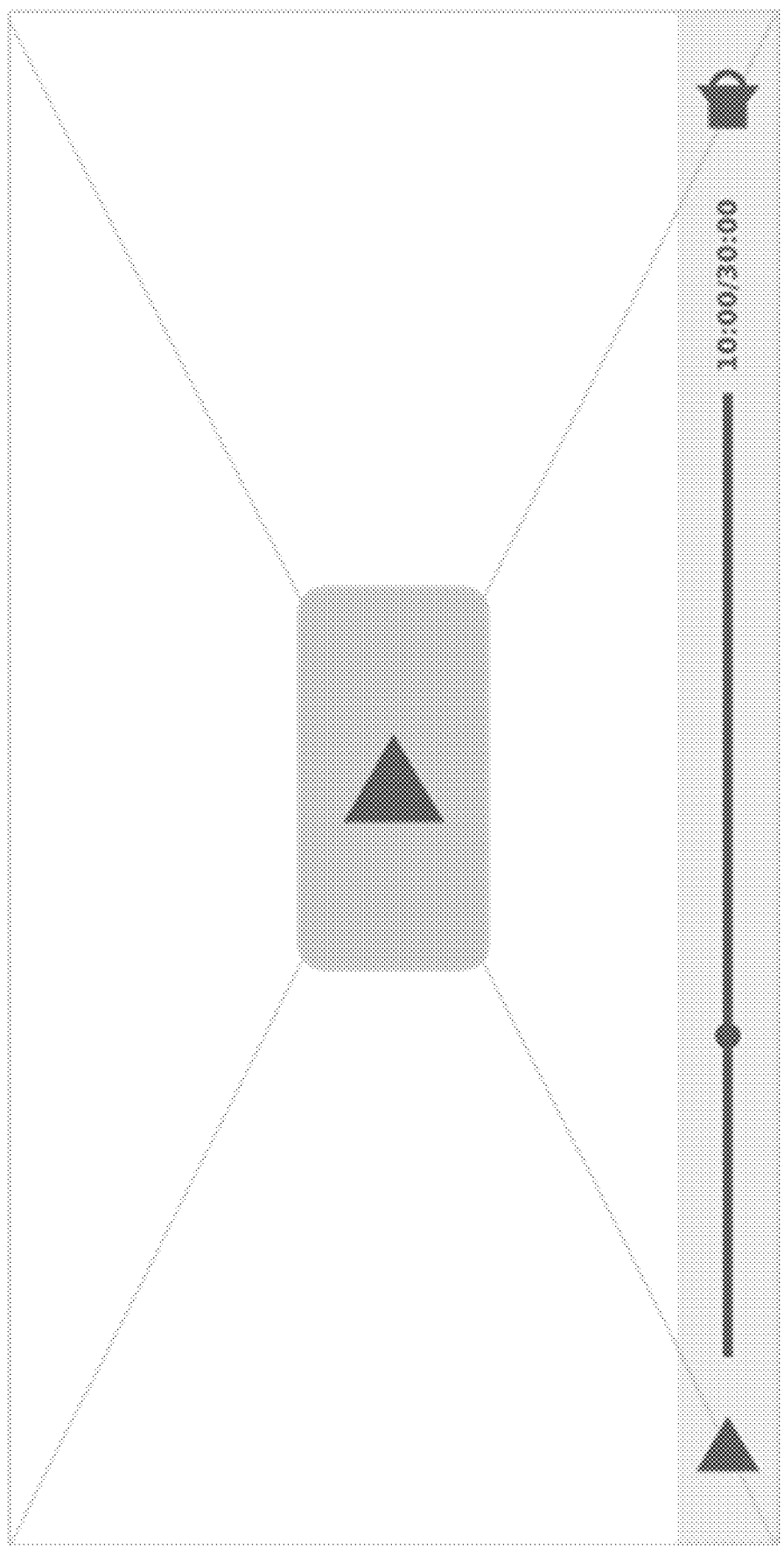
FIGS. 11-14 illustrates examples of the presentation timeline annotation user interface.

The backend components may include a backend annotation manager 902 and the presentation database 44 described above and the client side components may include an annotation component 920 and a presentation component 910. Each of the components shown in FIG. 9 may be implemented in hardware or software or a combination of hardware and software. In one embodiment, each of the components may be a plurality of lines of computer code that may be stored in a memory of the backend or client device and then executed by a processor of the backend or client device. The annotation component 920 of the client side may perform the annotation operations and functions described below in more detail while the presentation component 910 may generate the user interface of the presentation and display the presentation to each audience member such as is shown, for example, in FIGS. 7 and 11.

The backend annotation manager 902 and a client annotation manager 924 (that is part of the annotation component 920 on the client) each may control the annotations made to the presentation. For example, either of the annotation managers 902, 924 (or both of them in some embodiments) may allow a user (the presenter or producer of the presentation or the audience member that receives the presentation) to set one or more settings of the presentation timeline annotation system. For example, each or both of the annotation managers 902, 924 may allow a user to configure one or more annotation selectors that trigger (for an audience member) the marking of a segment of the presentation with an interactive annotation wherein the interaction annotation may include, for example, a question, an answer, a comment, a note, a review or a rating of the presentation. The one or more annotation selectors may be key presses, such as for a personal computer, desktop computer, tablet computer, etc. or a gesture, such as for smartphone devices, tablet computer and the like. For example, the gesture may be a hand movement on a Samsung Galaxy smartphone device or the movement of a device that indicates user intent, such as a shake motion. In some embodiments, the one or more annotation selectors may be preconfigured using the annotation manager 902 by the content presenter or producer.

A non-limiting example of different key presses that may be used as the one or more annotation selectors are shown in Table 1 below.

TABLE 1

| Sample Key/Key Combination | Action |
| --- | --- |
| Q | Mark current segment with a question |
| Shift + Q | Mark current segment with a question and add a question |
| N | Mark current segment with a note |
| Shift + N | Mark current segment with a note and add a text note |
| R | Mark current segment with a review |
| Shift + R | Mark current segment with a review and add a review |

Figure 10:
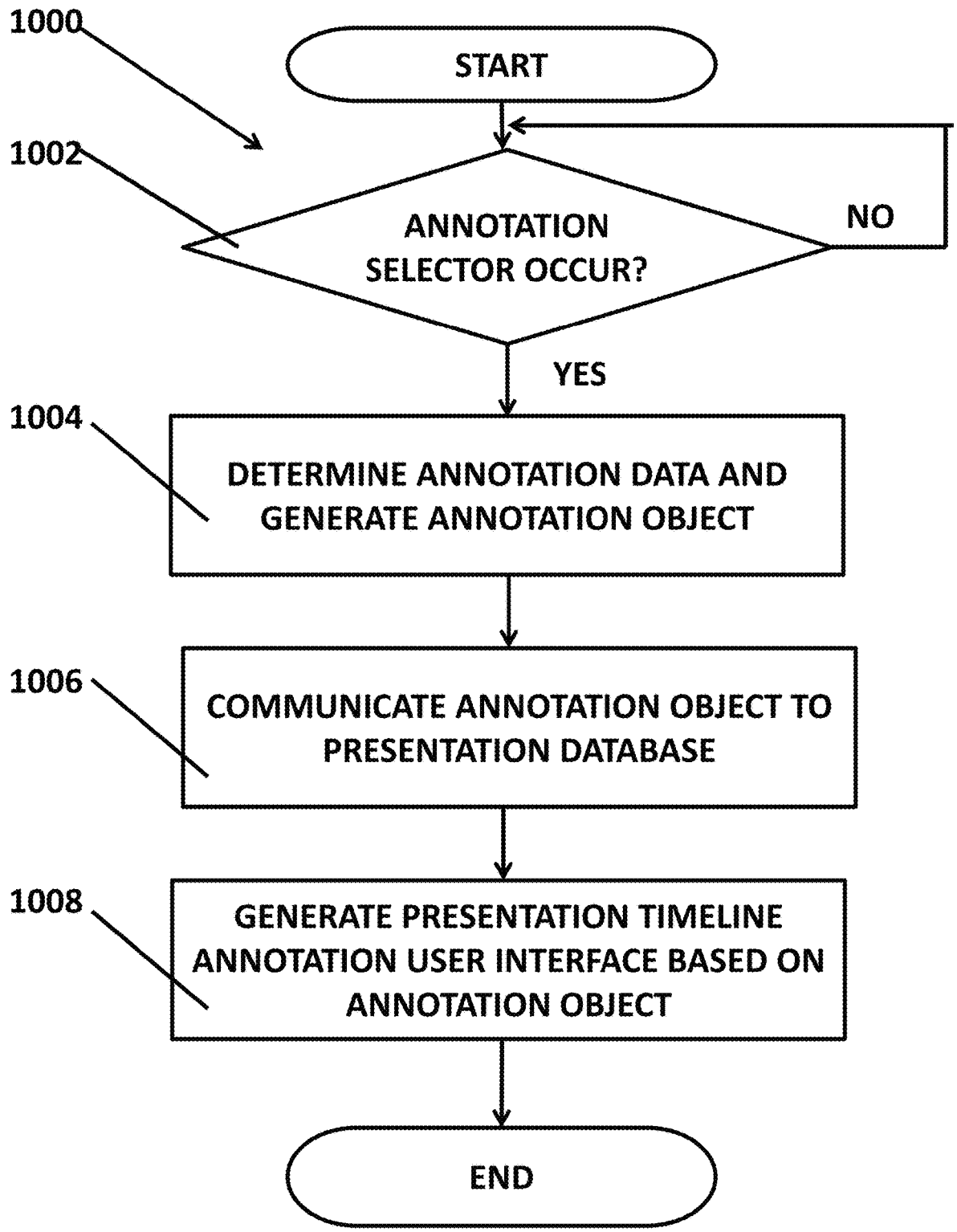
FIG. 10 illustrates a method for presentation timeline annotation.
Figure 12:
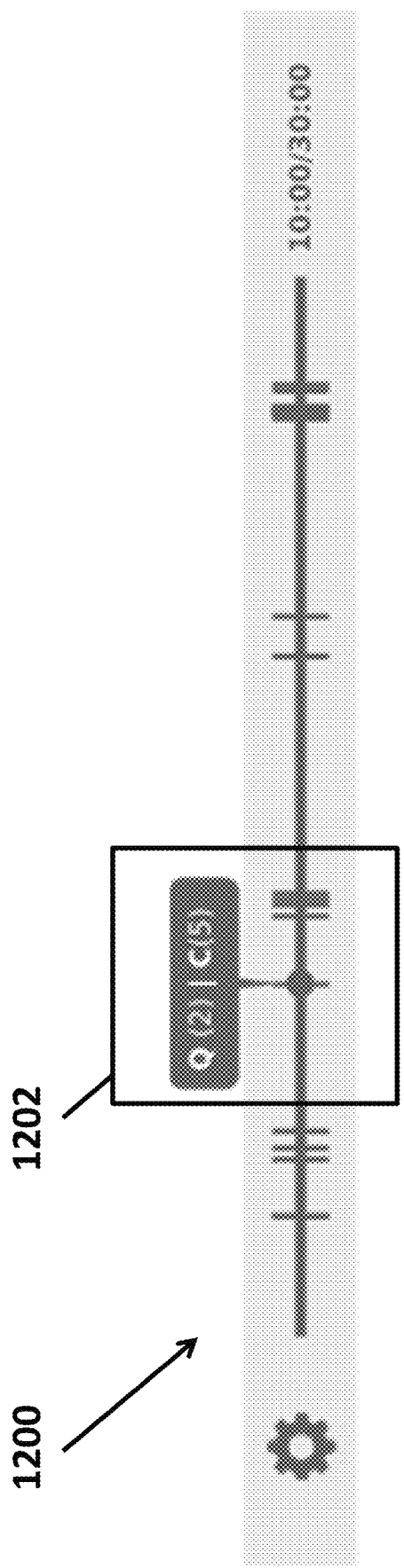
Figure 13:
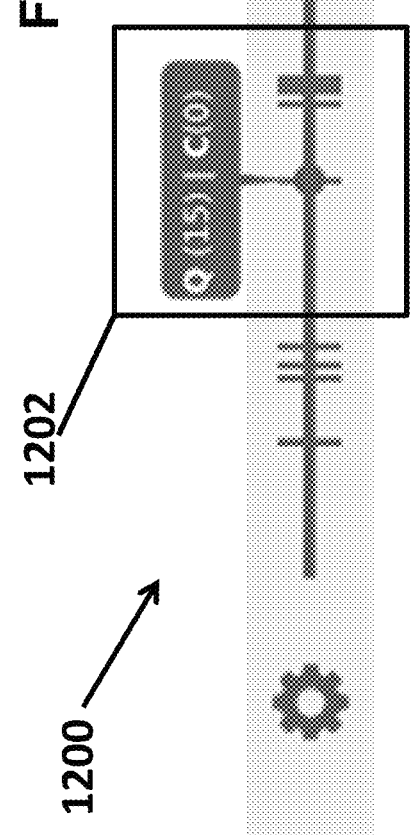
Figure 14:
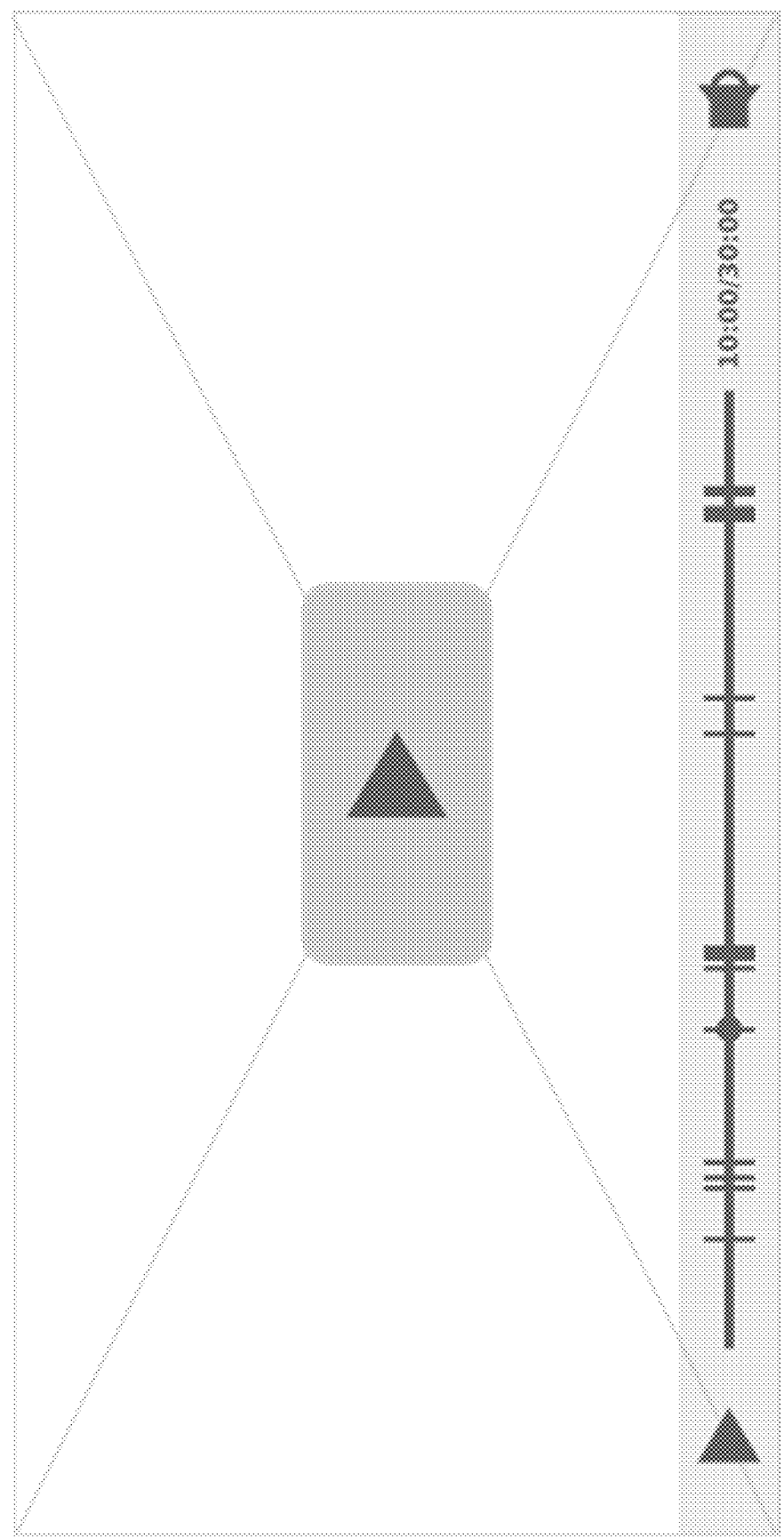

As shown in FIG. 9, the annotation component 920 also may include an annotation event handler 928 and an annotation user interface (UI) generator 930. The annotation event handler 928 may perform one or more functions to implement the presentation timeline annotation method as shown in FIG. 10 while the annotation user interface generator 930 may generate the annotation user interface elements displayed to the user (examples of which are shown in FIGS. 11-14) or as shown in FIG. 7 when the annotations are used in conjunction with a user interface widget. For example, FIG. 14 illustrates an example of the presentation display and the annotation display that may be displayed to the user.

FIG. 10 illustrates a method for presentation timeline annotation 1100 that may be implemented, for example, using the backend and client side components shown in FIG. 9. In the method, a client side component, such as the annotation event handler component of the annotation component, may listen/detect the one or more annotation selector events (1002) and delegate the relevant annotation selector events to the appropriate annotation event handler. If no annotation selector events occurs, then the method loops back to the start. If an annotation selector events occurs, the annotation event handler may determine a time reference, such as a current timestamp or slide number of video/audio and slideshow, respectively, at which the annotation selector event occurred (1004.) The time reference is an important point of reference, which is maintained throughout the lifetime of content. The time reference identifies a point in the presentation at which an audience member wants to make an annotation to the presentation timeline.

The annotation event handler also may, based on the time reference of the annotation event, create a custom annotation object, such as using JavaScript for example, with annotation type and time reference as two primary properties. Everything in a JavaScript world are objects, in its simplest form a pair of curly braces represents a JavaScript object, e.g. { }. There are several ways to create, manipulate and maintain such objects. Various types of properties and methods can be added to these objects, e.g. var annotationObject={'annotationName': 'Webcast 101', 'annotationTimestamp': 1381179374, 'annotationCreator': 'John Appleseed', 'annotationType': 'Q&A'}; Here annotationObject is created upon user interaction and it can be transferred across servers, stored in databases and dispatched to other clients.

The annotation event handler also may communicate the annotation object to the presentation database 44 (1006) using a protocol, such as a simple client-server communication protocol. The communication of the annotation object for each annotation event for each audience member allows the annotations to be delivered to each audience member of the presentation. For example, in one implementation, the created annotation object may be delegated to a next client-side module (for a particular audience member) where view of the annotation may be generated (1008), styling is added and the object itself is added to the annotation timeline on the given time reference point (an example of which is shown in FIGS. 12-13). Thus, each audience member for the presentation can see the annotations of the other audience members.

Two examples of an annotation user interface element 1200 are shown. FIG. 12 shows an example of a presentation timeline annotation user interface element for a video presentation element while FIG. 13 shows an example of a presentation timeline annotation user interface element for a slideshow presentation element. As shown in both Figures, the presentation timeline annotation user interface element may include an annotation indicator element 1202 that shows a location in the presentation at which one or more annotations occurred as well as the different types of annotations at each point in the presentation. For example, as shown in FIG. 12, there are two questions (indicated by Q(2)) and five comments (indicated by C(5)) ten minutes into the exemplary 30 minute video presentation. In FIG. 13, there are fifteen questions (indicated by Q(15)) and no comments (indicated by C(0)) at slide 10 of 30 slides of the exemplary slideshow presentation. As shown in these figures, the presentation timeline annotations are shown at the same time or in-line with the presentation so that the audience member is able to interact with the presentation while continuing to be engaged by the presentation.

In some embodiments, the dimensions of the presentation annotation timeline may be proportional to the duration or length of presentation. For example, for video/audio content, the system may have a one-to-one mapping of content duration and annotation timeline dimensions. For slideshows, for example, the system may have a control where its behavior and presentation is similar to HTML5 video player control.

In each user interface displayed to each audience member (such as that shown in FIGS. 12-14), the audience member can select an annotation in the timeline, such as by hovering over or clicking on the annotation, and an element, such as a text bubble, may be displayed such as is shown in FIGS. 12-13. The text-bubble may show the type and count of the audience member's interactions possibly showing interactions from other audiences and presenter. At any given point on the timeline, there could be zero or more annotations, where each annotation can be created by different users. Also, each annotation belongs to one of the supported annotation types such as Questions (Q), Answers (A), Rating (R) or Comment (C). Text-bubble is used to show type and count of annotation. For example, a timestamp containing 4 questions, 6 answers, 8 ratings and 0 comment can be displayed as Q(4) A(6) R(8) C(0). If an audience member selects the element, such as by clicking the text-bubble or double clicking the annotation mark, the user interface may present the audience member with the options to further interact with the annotation or open a specific widget from the dock etc. Continuing from above example of Q(4) A(6) R(8) C(0), a user could click on the 'Q' to open a widget containing 4 questions and a form to add new question.

The system of presentation timeline annotation also may be configured to support unary task only such as note taking. Thus, an audience member is able to mark a segment with notes and later have those notes emailed as a PDF or added to video as closed-caption.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An annotation system for a presentation, comprising:
a computing device having a processor that executes a plurality of instructions;
a presentation system, connected to the computing device over a network, having a store that stores one or more presentations that may be provided to the computing device;
the computing device being configured to:
display a presentation;
mark, for a segment among one or more specifically marked segments while the presentation is being displayed, a segment of the presentation with a plurality of different types of interactive electronic annotations using a plurality of user configurable annotation selectors, wherein each annotation selector is configured by the user to perform a user selected annotation, the plurality of different types of interactive electronic annotations including a comment annotation that marks the segment of the presentation with a first question, a question annotation that one of marks the segment of the presentation with a first question and marks the segment of the presentation with the first question and adds a second question, a note annotation that one of marks the segment of the presentation with a note and marks the segment of the presentation with the note and adds a text note, and a review annotation that one of marks the segment of the presentation with a first review and marks the segment of the presentation with the first review and adds a second review; and
the presentation system being configured to:
receive the user selected annotation for the presentation;
generate an annotation timeline for the presentation, the annotation timeline showing an identifier which identifies types of each of the plurality of user selected annotations and a number of each of the user selected annotations for the identified types made at a commonly marked segment among the one or more marked segments during the presentation that includes the different types of at least two of the question annotation, the review annotation, the note annotation and a comment annotation; and
communicate the annotation timeline to each computing device that displays the presentation so that annotation timeline is displayed on each computing device.

2. The system of claim 1, wherein the computing device is further configured to determine a time reference of the presentation at a time of the marking of the segment.

3. The system of claim 2, wherein the time reference is one of a timestamp of the presentation and a slide number of the presentation.

4. The system of claim 1, wherein the computing device is further configured to generate an annotation object.

5. The system of claim 4, wherein the annotation object is a Javascript annotation object.

6. The system of claim 4, wherein the computing device is further configured to communicate the annotation object to the store of the presentation system.

7. The system of claim 1, wherein the computing device is further configured to display the annotations adjacent to the presentation.

8. The system of claim 1, wherein the computing device is further configured to have a settings menu so that one or more annotation selectors are configured, wherein the one or more annotation selectors indicate a marking of a segment of the presentation.

9. The system of claim 8, wherein each annotation selector is a key press.

10. The system of claim 8, wherein each annotation selector is a gesture.

11. The system of claim 8, wherein the computing device has an annotation manager that configures the one or more annotation selectors.

12. The system of claim 8, wherein the presentation system has an annotation manager that configures the one or more annotation selectors.

13. The system of claim 1, wherein the annotation is one of an answer and a rating.

14. The system of claim 1, wherein the computing device is further configured to detect an annotation selector event that indicates that the user is marking a segment of the presentation.

15. The system of claim 1, wherein the computing device further comprises an annotation user interface generator that generates a presentation timeline annotation element having an annotation indicator.

16. The system of claim 15, wherein the annotation user interface generator generates a user interface element that displays all of the annotations for the presentation.

17. A method for annotating a presentation being delivered to a computing device by a presentation system, connected to the computing device over a network, having a store that stores one or more presentations that may be provided to the computing device of a user, the method comprising:

displaying, by a computing device, a presentation;

marking, using the computing device, a segment among one or more specifically marked segments of the presentation with a plurality of different types of interactive electronic annotations using a plurality of user configurable annotation selectors while the presentation is being displayed, wherein each annotation selector is configured by the user to perform a user selected annotation, the plurality of different types of interactive electronic annotations including a comment annotation that marks the segment of the presentation with a first question, a question annotation that one of marks the segment of the presentation with a first question and marks the segment of the presentation with the first question and adds a second question, a note annotation that one of marks the segment of the presentation with a note and marks the segment of the presentation with the note and adds a text note, and a review annotation that one of marks the segment of the presentation with a first review and marks the segment of the presentation with the first review and adds a second review;

receiving, by the presentation system, the user selected annotation for the presentation;

generating, by the presentation system, an annotation timeline for the presentation, the annotation timeline showing an identifier which identifies types of each of the plurality of user selected annotations and a number of each of the user selected annotations for the identified types made at a commonly marked segment among the one or more marked segments during the presentation that includes the different types of at least two of the question annotation, the review annotation, the note annotation and a comment annotation; and communicating by the presentation system, the annotation timeline to each computing device that displays the presentation so that annotation timeline is displayed on each computing device.

18. The method of claim 17 further comprising determining a time reference of the presentation at a time of the marking of the segment.

19. The method of claim 18, wherein the time reference is one of a timestamp of the presentation and a slide number of the presentation.

20. The method of claim 17 further comprising generating an annotation object.

21. The method of claim 20, wherein the annotation object is a Javascript annotation object.

22. The method of claim 20 further comprising communicating the annotation object to the store of the presentation system.

23. The method of claim 17 further comprising displaying the annotations adjacent to the presentation.

24. The method of claim 17 further comprising configuring the one or more annotation selectors.

25. The method of claim 24, wherein configuring the one or more key presses further comprises configuring the one or more key presses by one of a user of the computing device and an author of the presentation.

26. The method of claim 17, wherein each annotation selector is a key press.

27. The method of claim 17, wherein each annotation selector is a gesture.

28. The method of claim 17, wherein the annotation is one of an answer and a rating.

29. The method of claim 17, wherein marking the segment of the presentation further comprises detecting an annotation selector event that indicates that the user is marking a segment of the presentation.

30. The method of claim 17 further comprising generating a presentation timeline annotation element having an annotation indicator.

31. The method of claim 30 further comprising generating a user interface element that displays all of the annotations for the presentation.

* * * * *